(12) United States Patent
Torgerson et al.

(10) Patent No.: US 8,209,663 B2
(45) Date of Patent: Jun. 26, 2012

(54) DYNAMIC GENERATION OF FORMATTED USER INTERFACES IN SOFTWARE ENVIRONMENTS

(75) Inventors: Jay Ryan Torgerson, Hopkinton, MA (US); Ryo Shimizu, Brighton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1147 days.

(21) Appl. No.: 11/825,554

(22) Filed: Jul. 6, 2007

(65) Prior Publication Data
US 2007/0256053 A1    Nov. 1, 2007

Related U.S. Application Data

(63) Continuation of application No. 10/991,005, filed on Nov. 16, 2004, now Pat. No. 7,523,440.

(51) Int. Cl.
*G06F 9/44* (2006.01)
(52) U.S. Cl. .................................. 717/110; 717/104
(58) Field of Classification Search .......... 717/104–105, 717/110–113
See application file for complete search history.

(56) References Cited

U.S. PATENT DOCUMENTS 6,181,340 B1 * 1/2001 Alimpich et al. .............. 715/821
7,159,183 B1 * 1/2007 Kudukoli et al. .............. 715/762

OTHER PUBLICATIONS

AEA Technology, "Hysys.Process 2.2 Documentation", 2000, AEA Technology, http://ict.nioc.ir/it/engineering/doc/hysys/user_gd.pdf, 466 pages.*
Silicon Graphics, et al., "Common Desktop Environment (CDE) 5.1—Application Builder User's Guide", Jun. 2001, http://techpubs.sgi.com/library/manuals/0000/860-0202-002/pdf/860-0202-002.pdf, 168 pages.*
Barry Paton, "Fundamentals of Digital Electronics", Mar. 1998, National Instruments Corporation, 80 pages.*
Blair, Eric, "Review: Super Get Info 1.0.2," retrieved online at http://www.atpm.com/7.10/sgi.shtml (2001).
Sawyer, John, "Count all files in a folder hierarchy," retrieved online at http://www.macosxhints.com/article.php?mode=display&sid=20020410125219343&title=The+GUI+method&pid=0 (2006).
Windows Explorer, "Scrreenshots from Windows Explorer," (2000).
European Office Action for Application No. 05849664.7, dated Jul. 15, 2010.

* cited by examiner

*Primary Examiner* — Ted T Vo
(74) *Attorney, Agent, or Firm* — Nelson Mullins Riley & Scarborough LLP (57) ABSTRACT

Methods and systems for selecting multiple entities of a model or models to set or change data of the multiple entities together in a modeling environment are disclosed. When users create or edit a model or models, information on the entities of the model or models is provided to the users so that the users can select multiple entities in the model or models. On the selection of the multiple entities in the model or models, the modeling environment dynamically generates a user interface for the selected entities of the model or models for displaying, setting or changing data of the selected entities together. The user interface may display data of the selected entities that is not common to all of the selected entities in a different manner so that the users can identify common data of the selected entities.

21 Claims, 7 Drawing Sheets

DYNAMIC GENERATION OF FORMATTED USER INTERFACES IN SOFTWARE ENVIRONMENTS

RELATED APPLICATION

This application is a continuation of U.S. patent application Ser. No. 10/991,005, filed Nov. 16, 2004, the entire content of which is incorporated by reference herein.

FIELD OF THE INVENTION

The present invention relates generally to software environments and more particularly to methods and systems for dynamically generating a formatted user interface in the software environments.

BACKGROUND OF THE INVENTION

User interfaces are used in software development systems, such as software systems for developing bock diagrams, to enable users to enter data for creating and running the bock diagrams. Various classes of block diagrams describe computations that can be performed on application specific computational hardware, such as a computer, microcontroller, FPGA, and custom hardware. Classes of such block diagrams include time-based block diagrams such as those found within Simulink® from The MathWorks, Inc. of Natick, Mass., state-based and flow diagrams such as those found within Stateflow® from The MathWorks, Inc. of Natick, Mass., and data-flow diagrams and the Unified Modeling Language (UML). A common characteristic among these various forms of block diagrams is that they define semantics on how to execute the diagram.

In a block diagram modeling environment, data should be set for each component block to define the attributes, operations and other characteristic of the component block. The block diagram modeling environment may provide a dialog for entering the properties and parameters of the component block, such as a gain block. In the conventional modeling environment, a distinction is made between properties and parameters of the component block where parameters have a direct bearing on the functionality of the corresponding component block while properties may affect the execution in which the component block is used. In Simulink®, for example, the property dialog of a gain block specifies 'Description,' 'Tag,' 'Open function,' etc., which have no direct effect on the execution in which the gain block is used. The parameter dialog of the gain block specifies the gain value to be used as the factor in a multiplication, how this multiplication is to be executed and whether the result saturates in case of fixed-point computations, which determine the functioning of the gain block. The parameter dialog uses graphical user interface elements such as a pull-down list to specify the type of multiplication and a checkbox to specify whether saturation is allowed. This restricts the user input and prevents mistakes while providing immediate feedback as to which options are available for each of the selection mechanisms.

An important aspect of the use of graphical user interface elements to allow users to modify properties but also parameters and other data of the underlying block diagram model is the selection mechanism. In general, an entity has to be selected for which the properties and related data are listed and to which the new values apply. The conventional block diagram modeling environment allows users to select a single component block for setting or changing the data of the selected component block. However, allowing only one component block as the object of setting or changing data is too restrictive and time-consuming. Therefore, it is desired to select multiple component blocks to set up or change data of the multiple component blocks together.

SUMMARY OF THE INVENTION

The present invention provides methods and systems for selecting multiple entities of one or more objects to set or change data of the multiple entities together in a software environment. In an illustrative embodiment of the present invention, one or more models may be loaded in a modeling environment. When users create or edit the model or models, information on the entities of the model or models is provided to the users so that the users can select multiple entities in the model or models. The entities in the model or models may include configurations, subsystems, component elements, etc. of the model or models. On the selection of the multiple entities in the model or models, the modeling environment dynamically generates a user interface for displaying, setting or changing data of the selected entities together. The user interface may enable the users to edit the common data of the selected entities together. The user interface may display the data of the selected entities that is not common to all of the selected entities in a different manner so that the users can identify the common data of the selected entities. Those of ordinary skill in the art will appreciate that the modeling environment is illustrative and the present invention may apply to other software environments.

In one aspect of the illustrative embodiment, a method is provided for generating a user interface in a software environment. Users are able to select a plurality of entities in one or more objects loaded in the software environment. In response to the users' selection of the plurality of entities, a user interface is dynamically generated for editing information associated with the selected plurality of entities.

In another aspect of the present invention, a method is provided for providing a dynamic dialog interface in a modeling environment. A first user interface element is displayed for displaying entities of one or more models loaded in the modeling environment. Wherein the first interface element enables users to select multiple entities displayed in the first user interface element. In response to users' section of multiple entities, a second user interface element is displayed for displaying attributes associated with the selected multiple entities.

In still another aspect of the present invention, a medium is provided for holding instructions executable in a computational device that provides an environment for a software system. In the execution of the instructions, users are able to select a plurality of entities in one or more objects loaded in the software environment. In response to the users' selection of the plurality of entities, a user interface is dynamically generated for editing information associated with the selected plurality of entities.

In yet still another aspect of the present invention, a medium is provided for holding instructions executable in a computational device that provides an environment for modeling a system. On the execution of the instructions, a first user interface element is displayed for displaying entities of one or more models loaded in the modeling environment. The first interface element enables users to select multiple entities displayed in the first user interface element. In response to users' selection of multiple entities, a second user interface element is displayed for displaying attributes associated with the selected multiple entities.

The present invention dynamically generates a user interface for editing data of multiple entities in one or more models together. By enabling users to edit data of multiple entities together in the dynamically generated user interface, the present invention saves time for developing software systems, in particular, that include same or similar types of component elements in the software systems.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention provides a user interface that is dynamically generated on the users' selection of multiple entities in a model or models loaded in a block diagram modeling environment. Although the illustrative embodiment of the present invention will be described below relative to the block diagram modeling environment, those of ordinary skill in the art will appreciate that the present invention can apply to other software environment, such as software development systems. In the illustrative embodiment, one or more models may be loaded in the block diagram modeling environment so that users can create or edit the model or models. When the users create or edit the model or models, a partial or complete set of entities in the loaded model or models may be provided to the users so that the users can select one or more entities in the model or models. The entities of the model or models may include subsystems and component blocks of the model or models. One of skill in the art will appreciate that the entities provided on the list may include any entities that are required for documenting, editing, managing, or executing the model or models, such as the configurations of the model or models with a particular target for code generation.

On the selection of multiple entities in the set, the block diagram modeling environment dynamically generates a user interface for displaying and editing the data of the selected entities. The layout of the user interface may be formatted with general graphical user interface widgets, for example, in dialog boxes. The formatted user interface may consist of user interface elements that are positioned following a layout other than a single horizontal or vertical arrangement. In the illustrative embodiment, the formatted user interface may refer to a more general concept than a user interface that consists of a list view with properties, values and property/value pairs.

The user interface may enable the users to edit data of the selected entities that relates to the attributes, operations and other characteristic of the selected entities. The attributes of the entities may include properties, parameters and other data of the components block. The parameters of the component blocks may have a direct bearing on the functionality of the corresponding blocks while the properties of the components blocks may affect the execution the model in which the blocks are used. The operations of the entities may include methods operating on the selected entities. The user interface may enable the users to edit the common data of the entities together. The data of the entities that is not common to all of the selected entities are displayed in the user interface in a different manner, for example, in a different color so that the users can identify the common data of the selected entities.

The illustrative embodiment will be described solely for illustrative purposes relative to models implemented in a block diagram modeling environment. "Block diagram" will be used hereinafter as described above in the Background of the Invention. Although the illustrative embodiment will be described relative to models implemented in the block diagram modeling environment, one of skill in the art will appreciate that the present invention may apply to models implemented in other modeling environments including textual modeling environments, such as command line modeling environments, and different graphical modeling environments, such as state-based and flow diagram modeling environments, data flow modeling environments, and structure modeling environments.

Figure 1:
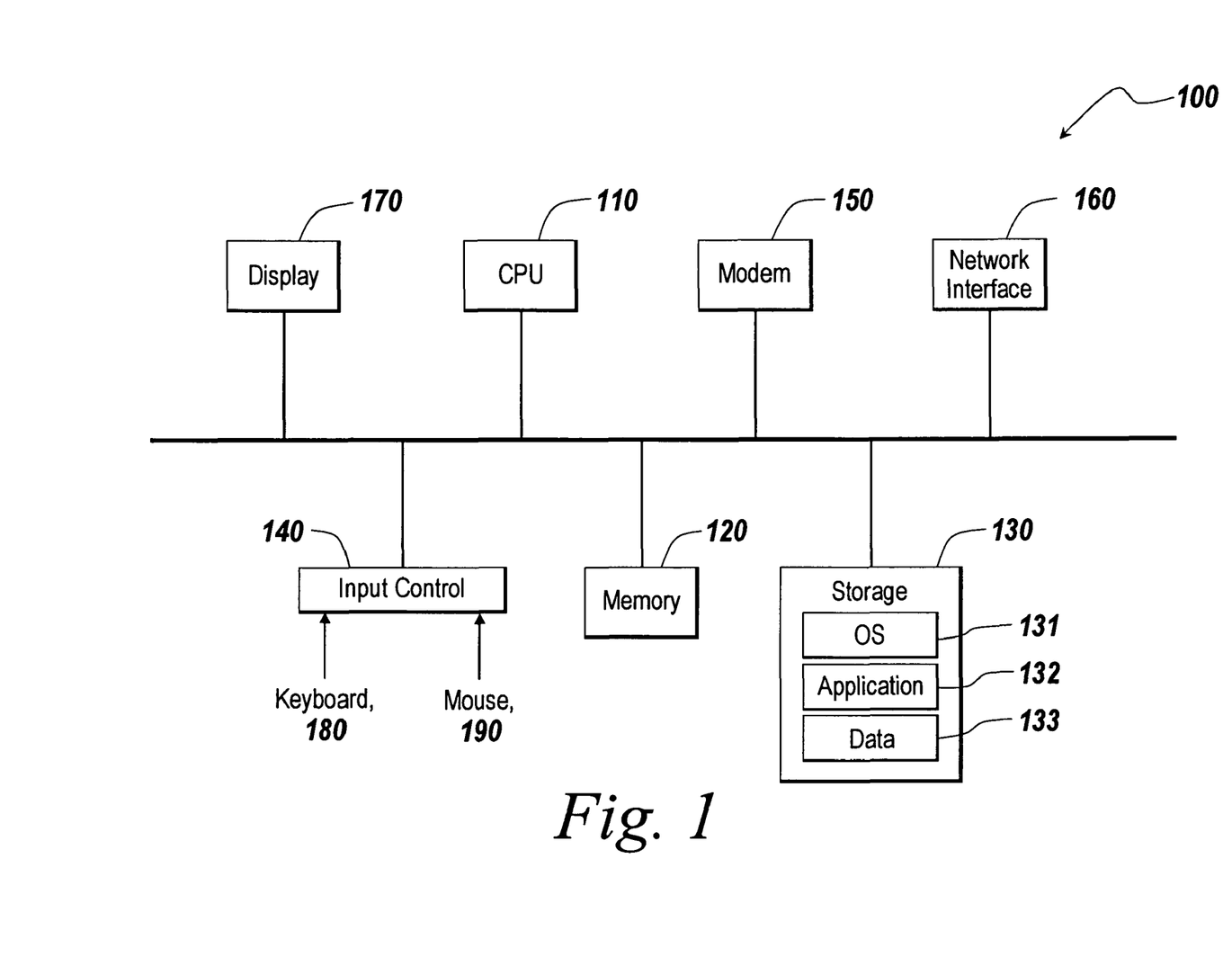
FIG. 1 shows an exemplary computational device suitable for practicing the illustrative embodiment of the present invention.

FIG. 1 is an exemplary computational device 100 suitable for practicing the illustrative embodiment of the present invention, which provides a block diagram modeling environment. One of ordinary skill in the art will appreciate that the computational device 100 is intended to be illustrative and not limiting of the present invention. The computational device 100 may take many forms, including but not limited to a workstation, server, network computer, quantum computer, optical computer, bio computer, Internet appliance, mobile device, a pager, a tablet computer, and the like.

The computational device 100 may be electronic and include a Central Processing Unit (CPU) 110, a memory device 120, storage medium 130, an input control 140, a network interface 160, a MODEM 150, a display 170, etc. The CPU 110 controls each component of the electronic device 100 to provide the block diagram modeling environment. The memory 120 fetches from the storage 130 and provides to the CPU 110 code that needs to be accessed by the CPU 110 to operate the electronic device 100 and to run the block diagram modeling environment. The storage 130 usually contains software tools for applications. The storage 130 includes, in particular, code 131 for the operating system (OS) of the device, code 132 for applications running on the operation system including applications for the block diagram modeling environment, and data 133 for the models created in the block diagram modeling environment.

The input control 140 may interface with a keyboard 180, a mouse 190, and other input devices. The electronic device 100 may receive through the input control 140 input data necessary for creating models in the block diagram modeling environment, such as the selection of the attributes and operations of component blocks in the models. The electronic device 100 may display in the display 170 the user interfaces dynamically generated for editing data of the selected multiple entities together. The network interface 160 and the MODEM 150 enable the electronic device 100 to communicate with other electronic devices through communication networks, such as Internet, intranet, LAN (Local Area Network), WAN (Wide Area Network) and MAN (Metropolitan Area Network). The communication facilities may support the distributed implementations of the present invention.

Figure 2:
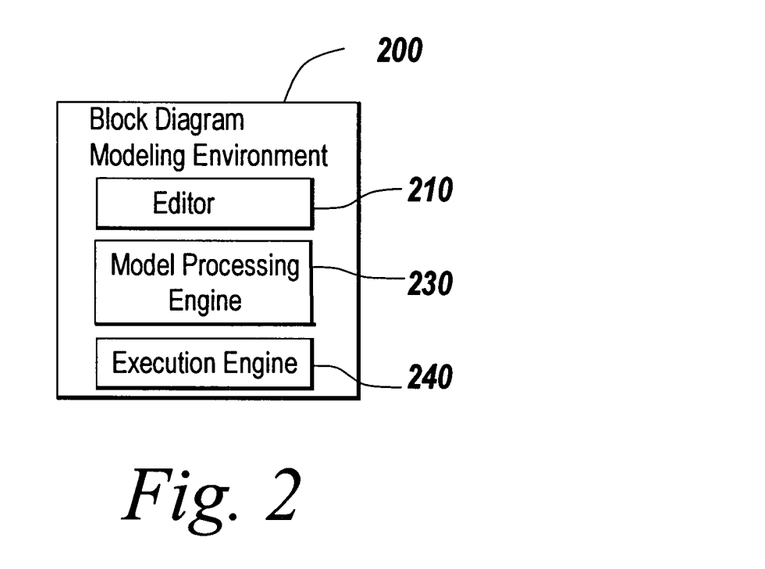
FIG. 2 depicts an exemplary application running on the computational device depicted in FIG. 1, which provides a block diagram modeling environment for modeling dynamic systems.

FIG. 2 depicts an exemplary application running on the electronic device 100 depicted in FIG. 1, which provides a block diagram modeling environment 200 for modeling dynamic systems. An exemplary block diagram modeling environment may be found in Simulink® from The MathWorks, Inc. The illustrative embodiment will be described relative to a model implemented in Simulink®. Nevertheless, those who are skilled in the art will appreciate that the present invention may be practiced relative to models implemented in other block diagram modeling environments, including but not limited to LabVIEW from National Instruments Corporation of Austin, Tex., and Rational Rose from IBM of White Plains, N.Y.

Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagram models of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor, such as the textual interface provided in MATLAB®. Using this textual interface, users may write special scripts that perform automatic editing operations on the block diagram. Simulink® also allows users to simulate the designed target systems to determine the behavior of the systems. Simulink® includes a block diagram model processing engine 230 that carries out the task of compiling and linking the block diagram to produce an "in-memory executable" version of the model that is used for generating code and/or simulating a block diagram model.

The block diagram modeling environment 200 may include at least a block diagram editor 210 and a block diagram execution engine 240. The editor 210 allows users to perform such actions as draw, edit, annotate, save, and print out block diagram representations of systems. The block diagram editor 210 is a graphical user interface (GUI) component that allows drafting of block diagram models by the users. Methods used in editing are called by the block diagram editor 210 in order to render the block appropriately in the GUI of its parent block diagram. For instance, this set of methods may include a BlockDrawIcon method that determines the shape the block icon has on the GUI. The block diagram editor 210 may allow users to specify the parameters for the block when they use it in their models. A user generally interacts with a set of windows that act as canvases for the model. There is generally more than one window for a model because models may be partitioned into multiple hierarchical levels through the use of subsystems.

The block diagram execution engine 240 contributes to the modeling software task of enabling the computation and tracing of a dynamic system's outputs from its block diagram model. The model processing engine 230 carries out the task of compiling and linking the block diagram to produce an "in-memory executable" version of the model that is used for generating code and/or simulating or linearizing a block diagram model. The execution of the block-diagram may also be referred to as simulation. The compilation stage involves preparing data structures and evaluating parameters, configuring and propagating block characteristics, determining block connectivity, and performing block reduction and block insertion. In the link stage, the model processing engine 230 uses the result of the compiled stage to allocate memory needed for the execution of the various components of the block diagram. The linking stage also produces block method execution lists which are used by the simulation or linearization of the block diagram. After linking has been performed, the model processing engine 230 may generate code. If this stage is performed, then the stages that follow use the generated code during the execution of the block diagram. If this stage is skipped completely, then the execution engine 240 uses an interpretive mode of execution for the block diagram.

Figure 3:
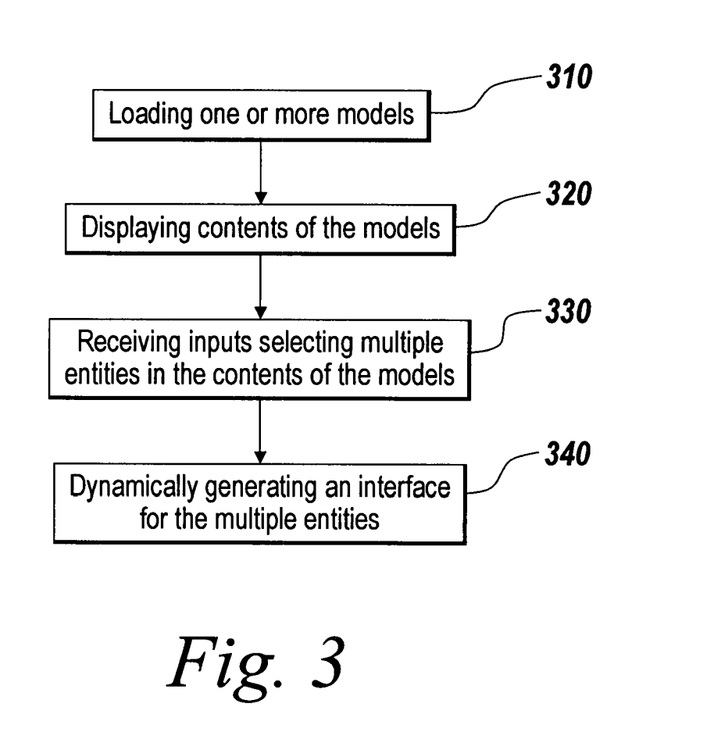
FIG. 3 is a flow chart showing an exemplary operation of the illustrative embodiment of the present invention for dynamically generating a user interface for the multiple entities of one or more models.
Figure 6:
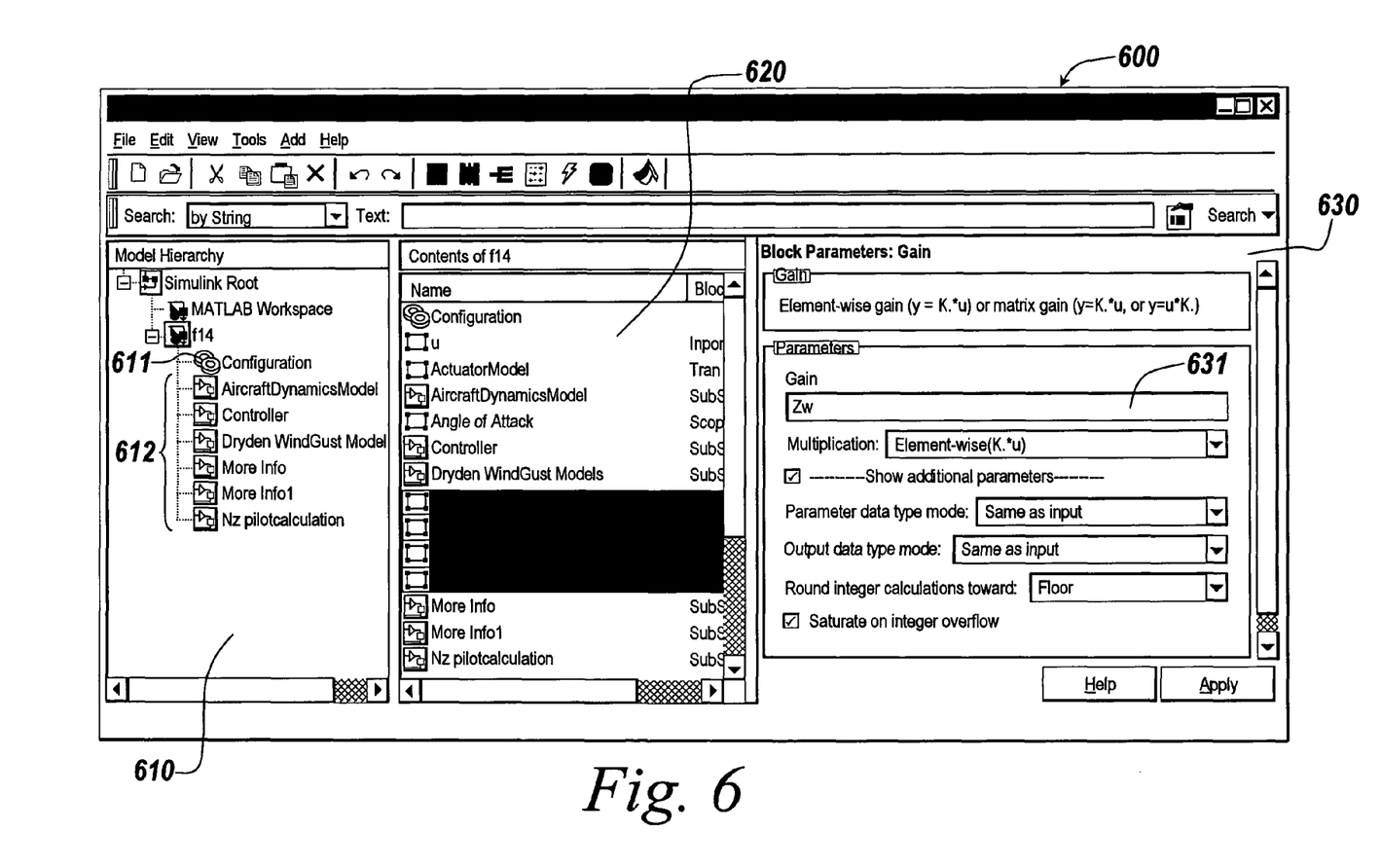
FIGS. 6 and 7 are exemplary GUIs including a pane for displaying data of the selected entities in a model or models.
Figure 7:
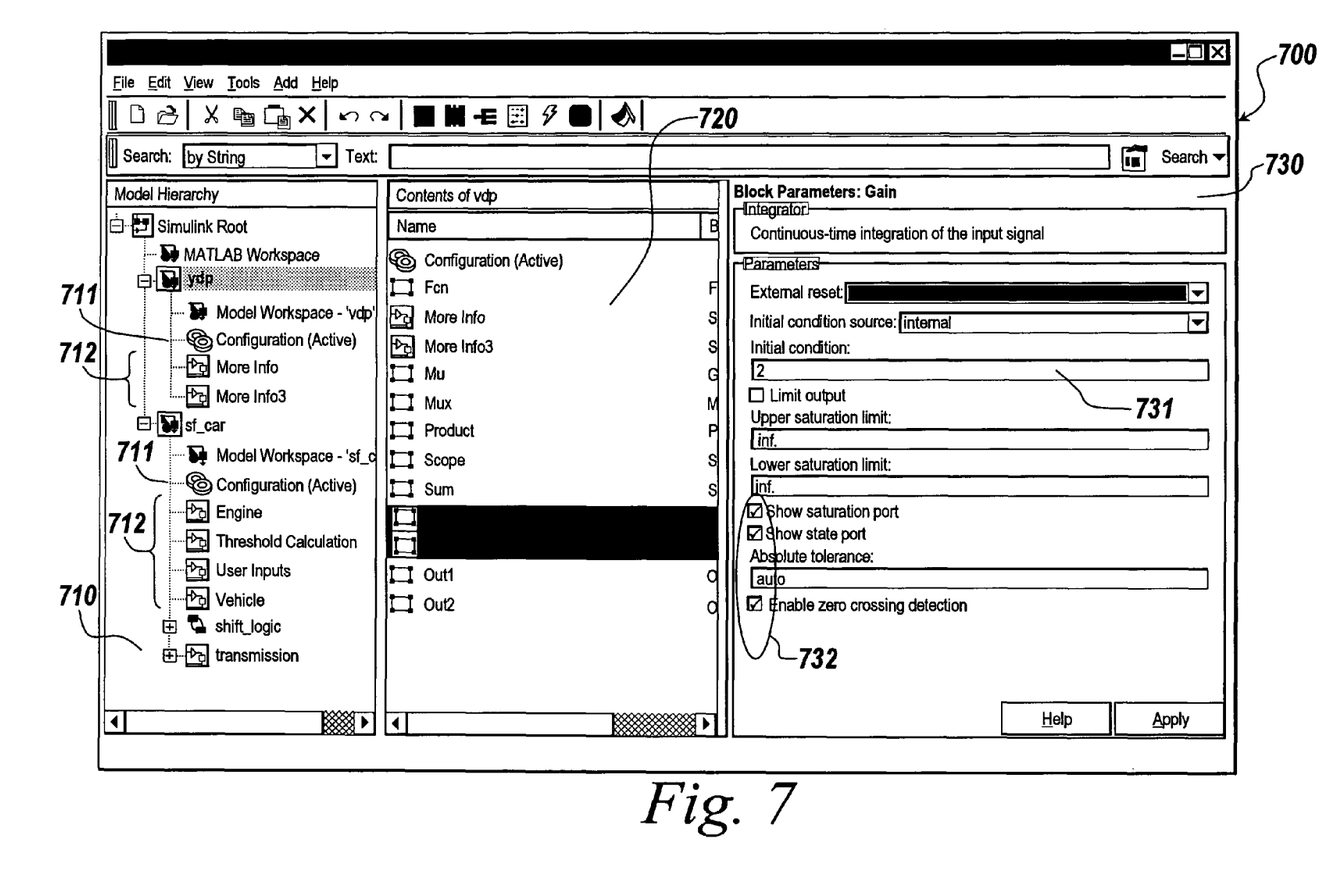

FIG. 3 is a flow chart showing an exemplary operation of the block diagram modeling environment 200 for dynamically generating a user interface for displaying or editing data of multiple entities of one or more models together. Users may load one or more models at the same time in the modeling environment 200 (step 310). For example, one model may be loaded and edited as depicted in FIG. 6, or multiple models may be loaded and edited together as depicted in FIG. 7. The editor 210 may display a partial or complete list of entities in the model or models loaded in the modeling environment so that the users can select one or more entities on the list (step 320). The list may contain the entities of the model or models such as: configurations, subsystems and component blocks and connections. The list displayed by the editor 210 will be described below in more detail with reference to FIGS. 6, 7 and 9. If the editor 210 displays the list of entities in the model or models loaded in the modeling environment, the users may select one ore more entities on the list to edit the data of the selected entities. If the users select one or more entities on the list (step 330), the modeling environment dynamically generates a user interface for displaying and/or editing the data of the selected entities together (step 340). The users may click one or more entities using a pointing device 190 to select one or more entities on the list. Alternatively, the users may input one or more criteria for searching entities using a command line interface to select one or more entities on the list. In the criteria search, the users may repeat the search with different criteria on previous search results to narrow down the search results. Therefore, the criteria search may be implemented as a hierarchical multi-criteria search mechanism. The user interface may include data for the attributes and operations of the selected entities. The dynamic generation of the user interface will be described below in more detail with reference to FIGS. 4, 5 and 8.

Figure 4:
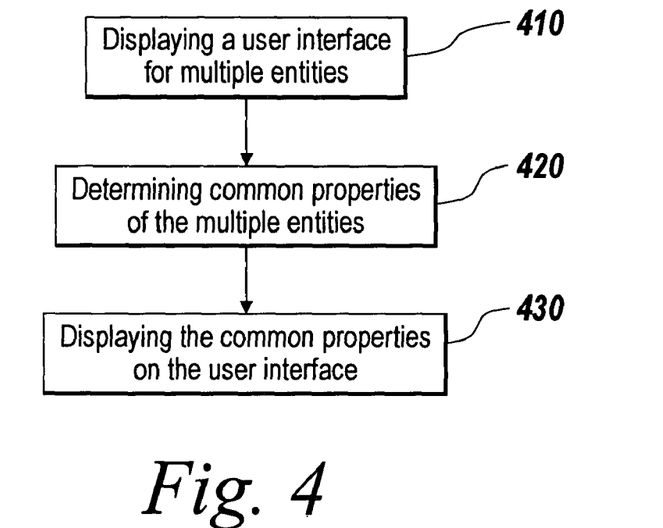
FIG. 4 is a flow chart showing an exemplary operation of the illustrative embodiment of the present invention for displaying data of the selected entities in the dynamically generated user interface.

FIG. 4 is a flow chart showing an exemplary operation of the illustrative embodiment of the present invention that displays the intersection of the data for the selected entities. In the illustrative embodiment, the modeling environment displays a user interface for editing the data of the multiple entities in one or more models loaded in the modeling environment (step 410). The modeling environment determines data of each of the selected entities based on the users' selection of the entities in the model or models (step 420). The modeling environment also determines whether the data associated with each of the selected entities is also associated with other selected entities. The modeling environment displays the common data associated with all of the selected entities ("the intersection of the data") on the user interface (step 430). One of skill in the art will appreciate that the display of the intersection of the data is illustrative and the user interface may display all of the data associated with at least one of the selected entities as described below in more detail with reference to FIG. 5.

Figure 5:
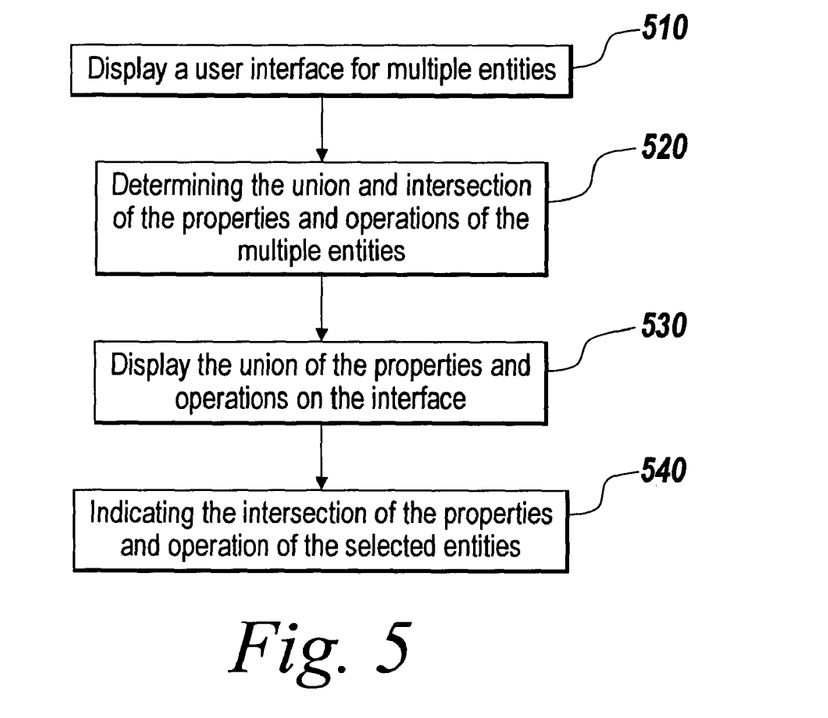
FIG. 5 is a flow chart showing another exemplary operation of the illustrative embodiment of the present invention for displaying data of the selected entities in the dynamically generated user interface.

FIG. 5 is a flow chart showing another exemplary operation of the illustrative embodiment of the present invention that displays the union of the data for the selected entities. In the illustrative embodiment, the modeling environment displays a user interface for editing data of the multiple entities in one or more models loaded in the modeling environment (step 510). The modeling environment determines data of each of the selected entities based on the users' selection of the entities in the models. The modeling environment also determines all of the data associated with at least one of the selected entities ("the union of the data"). The modeling environment may further determine the intersection of the data (step 520). The modeling environment displays in the user interface the union of the data for the selected entities (step 530) in which the intersection of the data may be indicated so that the users can identify the common data that is associated with all of the entities selected by the users (step 540). Exemplary user interfaces are depicted in FIGS. 6 and 7.

FIGS. 4 and 5 show exemplary operations for displaying the intersection and the union of the data for the selected entities, respectively. One of ordinary skill in the art will appreciate that these operations are illustrative and other sets of operations may apply to the present invention. For example, the present invention may be practiced to display data unique to at least one of the selected entities ("the exclusive OR of the data"). The exclusive OR of the data of the selected entities may be produced by subtracting the intersection of the data from the union of the data. One of skill in the art will appreciate that a mini toolbar may be provided at the top of the user interface showing set operations as buttons for: union, intersection and exclusive OR of the data.

FIGS. 6 and 7 are exemplary user interfaces including a pane dynamically generated on the users' selection of multiple entities in a model or models. FIG. 6 shows that one model (fl4) is loaded in the modeling environment, while FIG. 7 shows that two models (vdp and sf_car) are loaded in the modeling environment. The modeling environment may provide a graphical user interface (GUI) 600 or 700 that includes three panes ordered in a vertical manner. One of skill in the art will appreciate that the GUIs 600 and 700 are for illustrative purposes and may take any other forms, such as the GUIs ordered in a horizontal manner or the data in the three panes may be condensed into one or two panes or expanded into more panes.

The left-hand pane 610 or 710 of the GUIs contains a hierarchical view of all the presently loaded models. This hierarchical view mimics the subsystem hierarchy as designed by the users for the model or models, respectively. In addition to showing the subsystems 612 or 712 at any one particular level in the hierarchy, it shows the configurations 611 or 711 and other information for each of the subsystems. The center pane 620 or 720 shows the content view of the model or models. It shows the leaf blocks at each level as well as the subsystems and configuration and other information. Selections can be made in either the hierarchical view 610 or 710 or the content view 620 or 720. When users select multiple entities in the hierarchical view 610 or 710 or the entity view 620 or 720, the data for the selected entities is dynamically presented to the users in the right-hand pane.

In FIG. 6, the hierarchical view 610 shows that the fl4 model is loaded and selected, which includes a configuration 611 and subsystems 612. The center pane 620 displays the content of the selected model, fl4, including the configuration 611, subsystems 612 and leaf blocks of the model. In the illustrative embodiment, the four gain blocks Gain, Gain1, Gain2, and Gain5 are selected, hence they are highlighted in the content view 620. One of skill in the art will appreciate that the selection of gain blocks is illustrative and users may select any other entities of the model provided in the GUI 600. The cross-section of data of these blocks is dynamically generated and displayed in the right-hand pane 630. In the illustrative embodiment, all of the data presented in the right-hand pane 630 are indicated to be available for editing, and, therefore, the name of the blocks is not included. For the values that are identical throughout the selected entities, the widget 631 in the right-hand pane 630 appears in normal form so that the users can edit the value for selected blocks together.

In FIG. 7, the hierarchical view 710 shows that two models, vdp and sf_car, are loaded in the modeling environment and the vdp model is selected in the hierarchical view 710. The center pane 720 displays the content of the selected model (vdp) that includes the configuration, subsystems and leaf blocks of the model. One of skill in the art will appreciate that both of the models may be selected in the hierarchical view 710 and the content view 720 may display the content of both of the models selected in the hierarchical view 710. In the illustrative embodiment, the two blocks, x1 block and x2 block, are selected and highlighted in the content view 720. The union of the data of these blocks is dynamically generated and displayed in the right-hand pane 730. In the illustrative embodiment, the intersection of the data may be displayed normally in a clean widget. The widget for the data that differs between the selected entities may be grayed out. For example, the blank 731 for the initial condition and the check boxes 732 of the selected block are grayed out to indicate that not all values are the same in the selected blocks. In addition, if a property is a member of many entities' sets of properties, this property may be displayed bolder than otherwise. Likewise, properties for entities that are rarer may appear more faded. The resultant interface may give users a visual indication of the frequency of the different properties with respect to the selection.

FIGS. 6 and 7 are exemplary user interfaces including panes 630 and 730 dynamically generated on the users' selection of multiple entities in a model (FIG. 6) and models (FIG. 7), respectively. Although the parameters and properties displayed in the panes 630 and 730 is predetermined by the modeling environment to either the intersection of the data or the union of the data, one of skill in the art will appreciate that the modeling environment may enable users to customize the panes 630 and 730 so that the users can select parameters and properties of the selected entities to be displayed in the panes 630 and 640. In other illustrative embodiments of the present invention, the users may customize the panes 630 and 730 per instance. For example, the users can select parameters and properties of Gain to be displayed in the pane 630, and select parameters and properties of Gain 1, Gain 2 and Gain 5 to be displayed in the pane 630.

Figure 8:
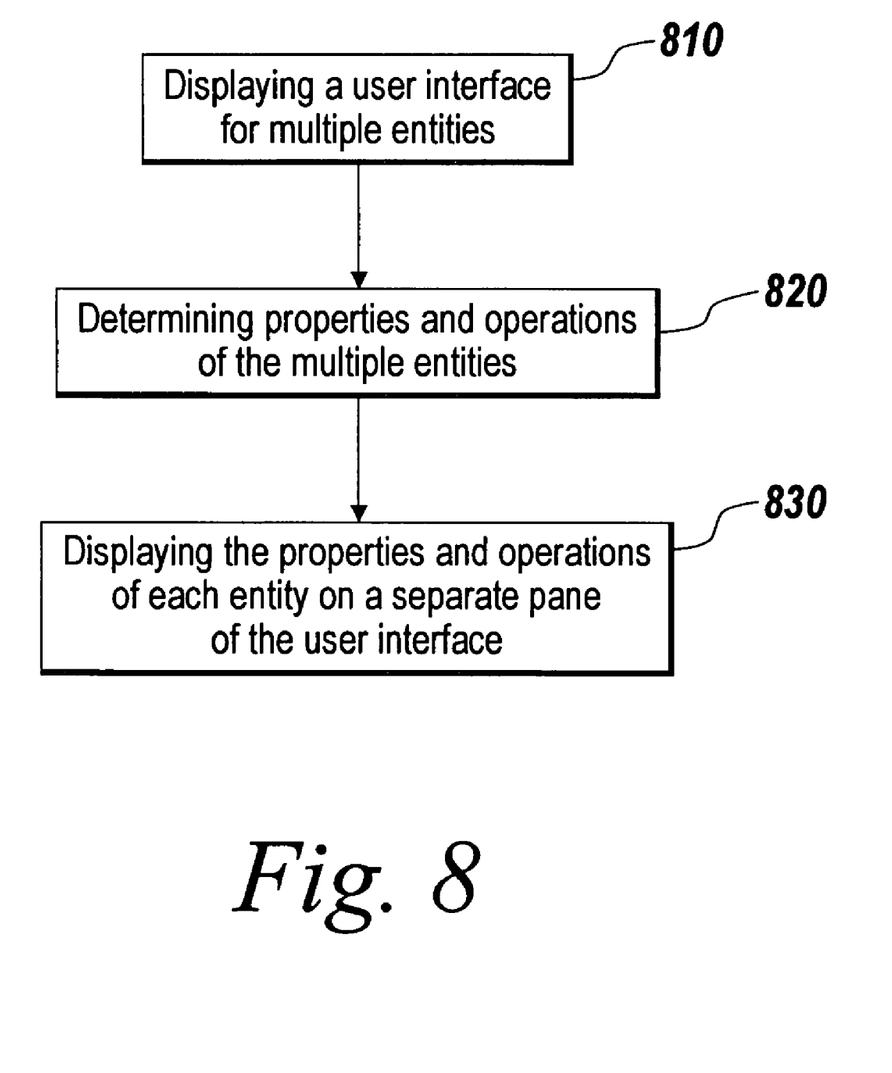
FIG. 8 is a flow chart showing an exemplary operation of another illustrative embodiment of the present invention for dynamically generating a user interface for the multiple entities of one or more models.
Figure 9:
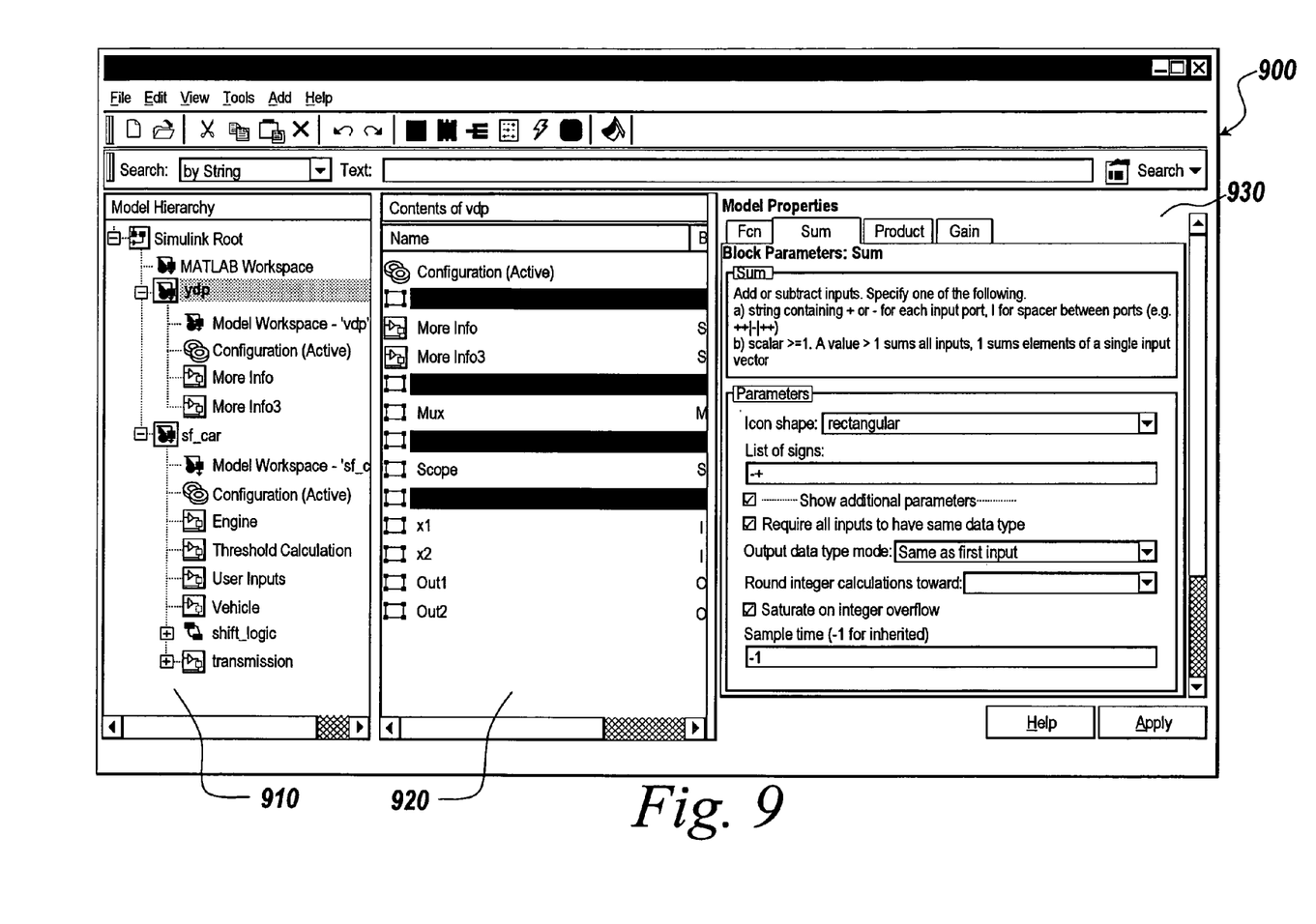
FIG. 9 is another exemplary GUI including a pane for displaying data of the selected entities in a model or models.

FIG. 8 is a flow chart showing an exemplary operation of another illustrative embodiment of the present invention that displays the data of the selected entities in separate panes. In this illustrative embodiment, the modeling environment displays a GUI for editing data of the multiple entities in one or more models loaded in the modeling environment (step 810). FIG. 9 depicts a GUI 900 provided for editing data of the multiple entities in the illustrative embodiment of the present invention. The left-hand pane 910 is a hierarchical view of the models loaded in the modeling environment. The center pane 920 provides the content of the model selected in the hierarchical view 910, including the configuration, subsystems and leaf blocks of the model. In the illustrative embodiment depicted in FIG. 9, multiple entities, such as Fcn Block, Mu Block, Product block, and Sum Block, are selected on the center pane 920. On the users' selection of the entities, the modeling environment determines the data of each of the selected entities based on the users' selection of the entities in the models (step 820). The modeling environment may further determine whether the data associated with each of the selected entities are common to all of the selected entities. The modeling environment displays the data of each of the selected entities on separate panes on a user interface (step 830). In the right pane 930 of the GUI 900 depicted in FIG. 9, separate panes for the selected entities, such as Fcn Block, Mu Block, Product block, and Sum Block, are displayed and overlapped with other panes. In each pane, the data common to the selected entities are displayed normally and the data that is not common to all of the selected entities are grayed out. One of skill in the art will appreciate that the right pane 930 may include a pane overlapped with other panes for displaying the intersection of the data of the selected entities (Fcn Block, Mu Block, Product block, and Sum Block), as described above with referenced to FIG. 4. One of skill in the art will also appreciate that the right pane 930 may include a pane overlapped with other panes for displaying the union of the data of the selected entities (Fcn Block, Mu Block, Product block, and Sum Block), as described above with referenced to FIG. 5.

In summary, the illustrative embodiment of the present invention provides for a dynamically generated user interface for editing multiple entities of a model or models together in a modeling environment. The models are implemented using a block diagram modeling tool in the illustrative embodiment, but the models may be implemented in other modeling environments. The modeling environment provides a hierarchical view or a content view of the entities of the model or models for the users to select multiple entities of the model or models. On the users' selection of the multiple entities of the model or models, the modeling environment dynamically generates a user interface for the selected entities. The dynamically generated user interface may enable the users to edit the common data of the selected entities together. The dynamically generated user interface may also display the data of the selected entities that are not common to all of the selected entities. The data displayed in the user interface may include attributes and operations of the selected entities. The user interface may be generated based on the context in which the user operates the models. For example, if users are in an editing, simulation or external mode, the users may see different properties of the models in a different dialog.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other modeling environments including textual and graphical modeling environments, such as a state-based modeling environment. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
   receiving an indication of at least one set operation;
   receiving an indication of a selected group of entities, the selected group comprising a plurality of entities, the entities:
   being associated with one or more properties,
   including at least one entity from a first object, and
   including at least one entity from a second object;
   determining, using a processor, a group of properties for the plurality of entities, where the group of properties is at least one of:
   common properties associated with each of the entities of the selected group of entities,
   properties associated with at least one of the entities of the selected group of entities, or
   properties associated with only one of the entities of the selected group of entities;
   providing a representation of the group of properties;
   receiving, an instruction to perform an edit operation on at least one of the properties of the group of properties; and
   applying the edit operation to the entities associated with the at least one property.

2. The method of claim 1, further comprising:
   providing a selection tool through which a user may select the at least one set operation.

3. The method of claim 1, wherein the at least one set operation includes a plurality of set operations.

4. The method of claim 1, wherein providing the representation of the group includes providing a user interface for editing the group of properties.

5. The method of claim 1, further comprising receiving an indication of the plurality of entities.

6. The method of claim 5, further comprising enabling a user to select the plurality of entities.

7. The method of claim 1, wherein the first and second objects include respective models in a software environment.

8. The method of claim 7, where the software environment includes at least one of a block diagram modeling environment, a textual modeling environment, a command line modeling environment, a state-based modeling environment, a flow diagram modeling environment, a dataflow modeling environment, and a structural modeling environment.

9. A non-transitory medium holding instructions executable in a computational device, the instructions for:
   receiving an indication of at least one set operation;
   receiving an indication of a selected group of entities, the selected group comprising a plurality of entities, the entities:
   being associated with one or more properties,
   including at least one entity from a first object, and
   including at least one entity from a second object;
   determining a group of properties of the plurality of entities, where the group of properties is at least one of:

common properties associated with each of the entities of the selected group of entities, properties associated with at least one of the entities of the selected group of entities, or properties that are associated with only one of the entities of the selected group of entities;

providing a representation of the group of properties;

receiving an instruction to perform an edit operation on at least one of the properties of the group of properties; and applying the edit operation to the entities associated with the at least one property.

10. The medium of claim 9, wherein the medium further holds instructions for providing a selection tool through which a user may select the at least one set operation.

11. The medium of claim 9, wherein the at least one set operation includes a plurality of set operations.

12. The medium of claim 9, wherein the medium further holds instructions for receiving an indication of the plurality of entities.

13. The medium of claim 12, wherein the medium further holds instructions for receiving a selection from a user of the plurality of entities.

14. The medium of claim 9, wherein the first and second objects include respective models in a software environment.

15. The medium of claim 14, where the software environment includes at least one of a block diagram modeling environment, a textual modeling environment, a command line modeling environment, a state-based modeling environment, a flow diagram modeling environment, a dataflow modeling environment, and a structural modeling environment.

16. A system for manipulating a block diagram, the system comprising:

a processor to:

receive an indication of at least one desired set operation, receive an indication of a selected group of entities of a software environment, the selected group comprising a plurality of entities, the entities:

being associated with one or more properties, including at least one entity from a first object, and including at least one entity from a second object, determine a group of properties of the plurality of entities based at least in part on the at least one set operation, where the group of properties is at least one of:

common properties associated with each of the entities of the selected group of entities, properties associated with at least one of the entities of the selected group of entities, or properties that are associated with only one of the entities of the selected group of entities;

a display element to:

display a representation of the group of properties; and an input device to:

provide an instruction to perform an edit operation on at least one of the properties of the group of properties, wherein the edit operation is applied to the entities associated with the at least one property.

17. The system of claim 16, wherein the processor is configured to provide a selection tool through which a user may select the at least one set operation.

18. The system of claim 16, wherein the at least one set operation includes a plurality of set operations.

19. The system of claim 16, wherein providing the representation of the group includes providing a user interface for editing the group of properties.

20. The system of claim 16, wherein the plurality of entities including at least one entity from a first object and at least one entity from a second object.

21. The system of claim 20, wherein the first and second objects include respective models in a software environment.

\* \* \* \* \*

UNITED STATES PATENT AND TRADEMARK OFFICE
CERTIFICATE OF CORRECTION

| | | |
|---|---|---|
| PATENT NO. | : 8,209,663 B2 | Page 1 of 1 |
| APPLICATION NO. | : 11/825554 | |
| DATED | : June 26, 2012 | |
| INVENTOR(S) | : Jay Ryan Torgerson et al. | |

It is certified that error appears in the above-identified patent and that said Letters Patent is hereby corrected as shown below:

In the Specification of the Invention of the printed patent, column 6, line 54, please change "ore" to --or--.

Signed and Sealed this
Sixth Day of November, 2012

David J. Kappos
*Director of the United States Patent and Trademark Office*